United States Patent [19]

Bellamy

[11] Patent Number: 5,402,979
[45] Date of Patent: Apr. 4, 1995

[54] OVERHEAD STORAGE APPARATUS

[76] Inventor: Charles M. Bellamy, 3574 Stubbs Mill Rd., Morrow, Ohio 45152

[21] Appl. No.: 182,859

[22] Filed: Jan. 18, 1994

Related U.S. Application Data

[63] Continuation-in-part of Ser. No. 537,057, Jun. 12, 1990, abandoned, which is a continuation of Ser. No. 333,438, Apr. 4, 1989, abandoned.

[51] Int. Cl.[6] .............................................. B60R 11/00
[52] U.S. Cl. .................................... 248/318; 248/322; 182/88; 182/127
[58] Field of Search .................................... 182/36–38, 182/88, 127; 211/116, 162, 126; 312/323; 248/322, 339, 317, 318; 296/37.6, 37.7, 37.8; 224/310, 311; 414/462

[56] References Cited

U.S. PATENT DOCUMENTS

| | | | |
|---|---|---|---|
| 603,856 | 5/1898 | Mower | 312/323 X |
| 624,231 | 5/1899 | Martin | 211/162 |
| 1,563,864 | 12/1925 | Juvet . | |
| 2,242,903 | 5/1941 | Crimmel | 62/103 |
| 2,639,068 | 5/1953 | Luby et al. | 224/311 X |
| 2,779,525 | 1/1957 | Vogel | 182/88 |
| 3,900,108 | 8/1975 | Rottermann | 211/162 |
| 4,247,144 | 1/1981 | Radek | 296/24 R |

Primary Examiner—Alvin C. Chin-Shue
Attorney, Agent, or Firm—Glenn D. Bellamy

[57] ABSTRACT

This invention provides an apparatus for overhead storage of elongated objects. The apparatus includes an elongated track (10) having first and second ends (14, 36) and being attached to an overhead support surface (12). A slidable support member (18) is slidably mounted on the track (10) and includes a carriage (20) with a downwardly-extending support arm (22). The slidable support member (18) is movable along the length of the track (10). A fixed support member (16) is adjacent the track's first end (14). An elongated object (24) may be supported adjacent opposite ends thereof (28, 32). A first end (28) is supported by the fixed support member (16) and a second end (28) is supported by the slidable support member (18). The elongated object (24) may be placed on the apparatus by placing the object's second end (28) on the slidable support member (18) when the slidable support member (18) is adjacent the track's first end (14). The slidable support member (18) is then moved along the length of the track (10) with the object (24) until the object's first end (32) may be supported by the fixed support member (16).

8 Claims, 6 Drawing Sheets

OVERHEAD STORAGE APPARATUS

RELATED APPLICATIONS

This application is a continuation-in-part of my patent application Ser. No. 07/537,057, filed Jun. 12, 1990, now abandoned, which is a continuation of Ser. No. 07/333,438, filed Apr. 4, 1989, now abandoned.

TECHNICAL FIELD

This invention relates to a track-mounted apparatus for overhead storage of elongated objects, and particularly to such an apparatus which allows access to the stored objects from only one end thereof.

BACKGROUND OF THE INVENTION

Elongated objects such as ladders, pipe, rods, or lumber and the like are often bulky and awkward to store. Usually these items are simply laid on the floor against a wall or suspended from the ceiling or wall on hooks. Such simple hooks will function adequately so long as the floor space below them is kept completely clear. For example, in order to lift a long extension ladder onto overhead hooks, one must either stand and lift near the ladder's center or, with the help of an assistant, lift the ladder at opposite ends. In either case, it is necessary that the floor space below the hooks be clear or that the floor space at both ends be clear. If the stored objects are relatively small pieces, such as pipe, lumber, or rods, it can be very difficult to select only one of these objects and remove it separately from the other objects stored on hooks or hangers.

Many devices have been made for storing long objects on vans or trucks. Typically, these are exterior racks mounted on the roof of the vehicle. Such racks are relatively costly and inconvenient to use. These racks are usually open and expose the objects to adverse weather conditions such as sun, snow, or rain. Even if the object, such as a ladder, is made of a material which is not affected by extreme weather conditions, dirt and moisture accumulating on it will brush off on the user or be carried into interior work areas.

Also, storage housings in the form of elongated tubes have been mounted on these exterior racks. These tubes are used for storing pipe, electrical conduits, or long drill bits and typically are openable only at one end. This makes it very difficult to select from the items stored in the tube and to remove one without disturbing the others. The alternative has been to store the items inside the vehicle, wasting precious cargo space or making them difficult to reach.

DISCLOSURE OF THE INVENTION

The present invention provides an apparatus for overhead storage of elongated objects which allows full access and viewing of the objects, while requiring physical access to only one end of the storage location.

The apparatus includes an elongated track with first and second ends. The track is attached to an overhead support surface. A slidable support member is slidably mounted on the track and includes a carriage with a downwardly-extending support arm. The slidable support member is movable along the length of the track and a fixed support member is located adjacent the first end of the track.

In use, an elongated object may be supported at opposite ends by a first end being held by the fixed support member and a second end being held by the slidable support member. The elongated object may be placed on the apparatus by placing its second end on the slidable support member when that member is moved to a position adjacent the track's first end. The slidable support member is then moved along the length of the track, along with the object, until the object's first end is in position to be supported by the fixed support member.

This allows an object to be hung overhead from the apparatus when access is available only to one end of the track. No floor space beneath the apparatus is required for placement or removal of the object. The apparatus may be used in a garage or workshop above items stored on the floor, or above a workbench or other work area.

The apparatus may also be adapted for use in the interior of a truck or van. The track may be mounted to the ceiling of such a vehicle and elongated objects, such as ladders, may be easily stowed or removed through the vehicles's rear doors. Typically, the apparatus will hold the objects closely adjacent the ceiling which will allow full use of the cargo space below and will not interfere with the driver's rear-view vision.

According to another aspect of the invention, the apparatus may include a storage tray mounted at one end to the slidable support member and having an opposite end supportable by the fixed support member. Such an apparatus is particularly useful when it is desirable to remotely store a variety of small, elongated objects, such as long drill bits, while retaining the ability to easily select one object without disturbing the others. The tray typically includes sidewalls and a bottom, with the top left open. In this manner, the entire tray may be slid out from its stowed position and let down to give the user full view of the objects, allowing him to select therefrom. The storage tray may then be lifted and slid back to its stowed position without requiring access to the space below the track.

Other significant aspects and advantages of this invention will be apparent from the complete description of the best mode of the invention, the several figures of the drawing, and the appended claims.

BRIEF DESCRIPTION OF THE DRAWINGS

Like reference numerals are used to refer to like parts throughout the various figures of the drawing.

BEST MODE FOR CARRYING OUT THE INVENTION

Figure 1:
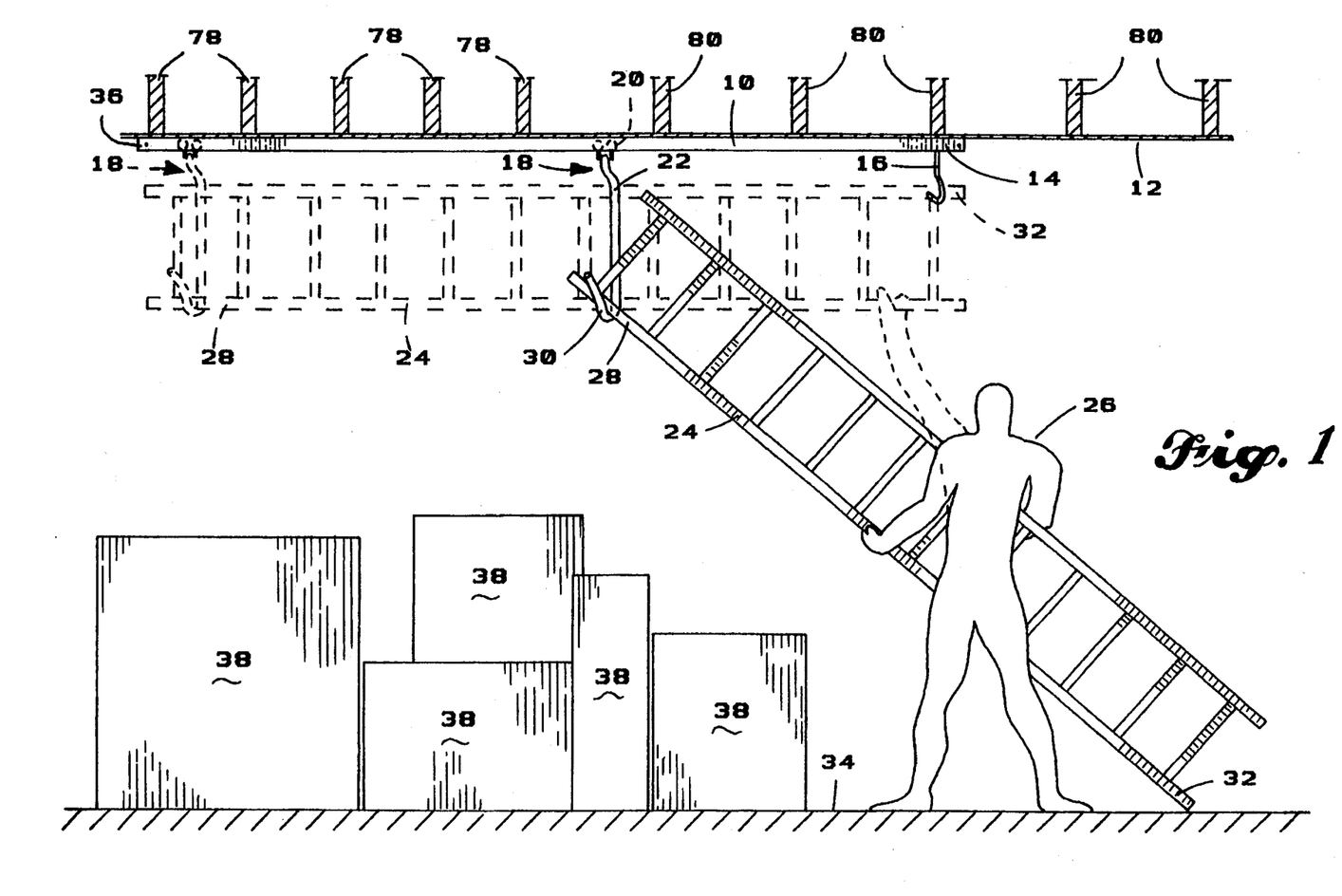
FIG. 1 shows a preferred embodiment of the invention for overhead storage of a ladder.

Referring to the several figures of the drawing, and first to FIG. 1, therein is shown an overhead storage apparatus according to one preferred embodiment of the invention. The apparatus includes an elongated track 10 mounted to an overhead surface 12. Adjacent a first end 14 of the track 10 is a fixed support hook 16. A slidable support member 18 is mounted on the track 10. The slidable support member 18 includes a carriage 20 and a downwardly-extending hook member 22.

In order to place an elongated object, such as a ladder 24, onto the apparatus, a user 26 will place one end 28 into the throat 30 of the hook 22 while resting the other end 32 on the floor 34. If the object or ladder 24 is sufficiently lightweight, the user 26 may simply hold it while placing one end 28 onto the slidable support member 18. The ladder 24 is then lifted by the user 26, pushing the end 28 toward the second end 36 of the track 10. The ladder 24 maintains sufficient frictional contact with the hook throat 30 to move the slidable support member 18 along with the ladder until the opposite end 32 is in position to be placed on the fixed support member 16. The ladder 24 is shown by broken lines in its stowed position in FIG. 1. It should be noted that the ladder 24 may be stowed or removed from the apparatus without having access to floor area beneath the track 10. FIG. 1 shows various objects 38 stacked on the floor 34 beneath the track 10. This area may also be used as work space because the stowed ladder 24 does not interfere with normal headroom below the track 10.

Figure 2:
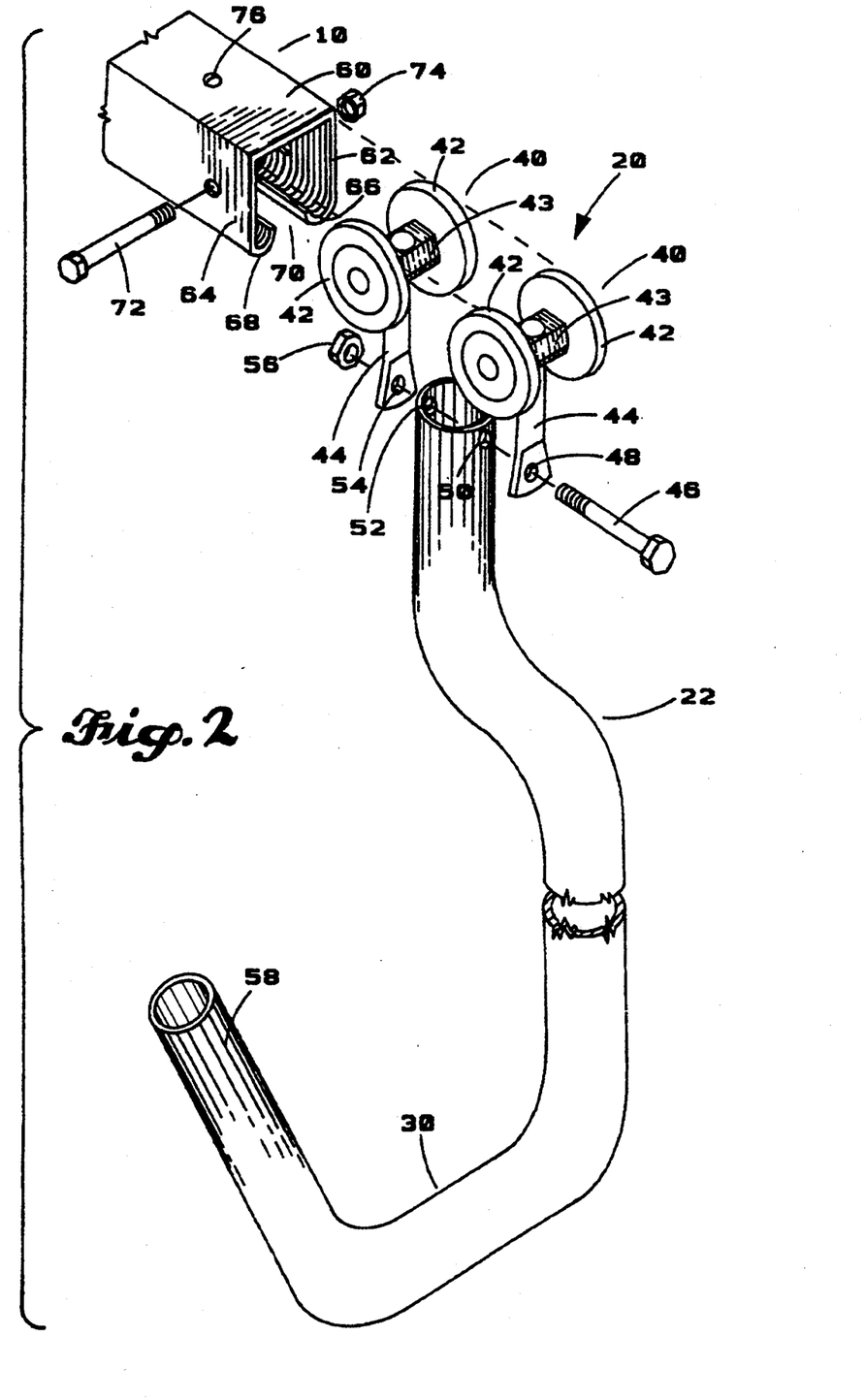
FIG. 2 is a fragmentary exploded view of a channel-shaped track, a rolling carriage, and ladder hook member.

Referring also to FIG. 2, the carriage 20 includes one or more set(s) of rollers 40. Each roller 40 includes a pair of co-axial wheels 42 mounted on an axle 43 with a downwardly-depending, pivoting stem 44. A lower portion of the stem 44 is connected to the hook portion 22 by a bolt 46 which is passed through aligned openings 48, 50, 52, 54 in the stems 44 and hook portion 22. The bolt 46 is secured in place by a nut 56.

The hook portion 22 may be of any suitable shape to accommodate the desired object to be suspended. The illustrated embodiment is particularly suited for a ladder 24, and has an adequately wide throat portion 30 and an upwardly-turned end portion 58. The hook 22 may be of a length to extend below the lower rail of the suspended ladder 24 or may be shortened to support the upper rail between rungs.

In preferred form, the track 10 is in the form of a downwardly-opening channel. This includes a top panel 60, a pair of downwardly-extending sides 62, 64, and a pair of inwardly extending flange or ledge portions 66, 68 defining a space 70 therebetween. The space 70 is of sufficient width to allow the stem portion 44 of each roller 40 to move freely along the track 10. Each flange or ledge portion 66, 68 is of sufficient width to carry the wheels 42. The flanges 66, 68 may be upwardly turned at interior edges to maintain proper alignment of the wheels 42 in the track 10. Of course, the sides 62, 64 are of sufficient height and spacing to allow the rollers 40 to move freely in the track 10. A stop member, such as a bolt 72 and nut 74, may be fitted at each end of the track 10 to prevent the carriage 20 from inadvertently being displaced from either end of the track 10. The track 10 may also be of any other suitable form such as an I-shaped rail with externally mounted rollers or carriage. The size and weight of the track should be selected according to the mass of the object it is intended to support.

The fixed support member 16 may be in the form of a hook or any other suitable form for supporting one end of the object which is intended to be held. In preferred form, the track 10 is mounted to the overhead structure 12 by passing a standard fastener, such as a screw or bolt, through openings 76 in the top panel 60 of the track 10. These openings 76 are preferably spaced at 8-inch intervals so that the spacing will accommodate ceiling joists spaced at either 16 inches or 24 inches on center. In FIG. 1, a series of joists 78 are shown spaced at 16-inch on-center intervals. A second series of joists 80 are shown spaced at 24-inch on-center intervals. Typically, the track 10 will be positioned either perpendicular to ceiling joists 78, 80, as shown in FIG. 1, or parallel to and directly below a single joist. The track 10 may be adapted to be mounted to any other type of overhead support surface 12 which will support the weight of the apparatus and the object to be stowed.

Shown in FIGS. 3–7 are alternative embodiments of the invention designed for use inside a vehicle, such as a truck or van 82. In this embodiment, the track 10 is mounted to structural ribs or stringers 84 which support the top of the van 82. A carriage 86 with a downwardly-extending support 88 is mounted to slide along the length of the track 10. Adjacent the rear end 126 of the track 10 is a fixed support 90, 92.

Figure 4:
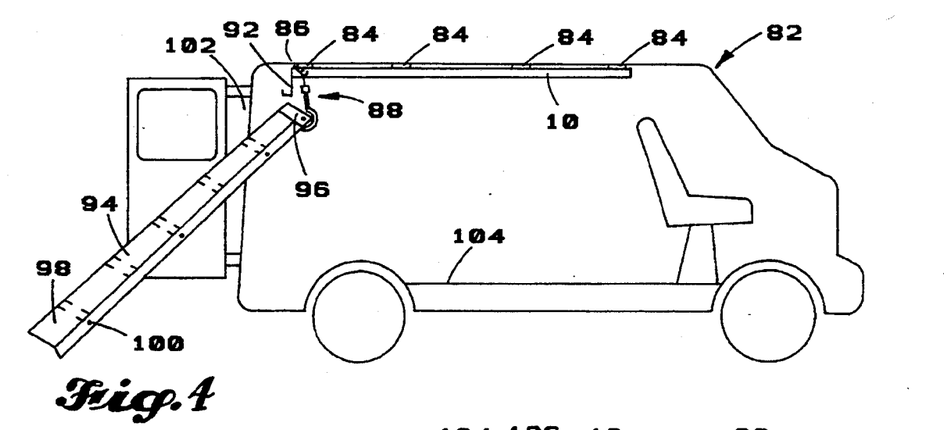
FIG. 4 is a side sectional view, taken substantially along line 4—4 of FIG. 5, of a van with a preferred embodiment of the invention for supporting a stepladder shown in an open position.

The embodiment shown in FIG. 4 is adapted for storing a stepladder 94 inside the van 82 adjacent the interior of its roof. A slidable support member 88 is provided to support one end of the stepladder. With the slidable support 88 adjacent the rear end of the track 10, one end 96 of the stepladder is placed on the support 88 while the opposite end 98 is lifted and pushed toward the front of the track 10. The slidable support 88 moves with the stepladder 94 until it is adjacent the forward end of the track 10 and a rung 100 of the stepladder 94 may be supported on the fixed support 92. The stepladder 94 is shown in a stowed position in FIG. 5. The stepladder 94 may be removed from its stowed position by simply lifting its end 98 from the fixed support 92 and sliding the ladder 94 and slidable support 88 rearwardly through the van's rear opening 102. When in its stowed position, the stepladder 94 is suspended above the floor 104 of the van 82 and does not obstruct the rear-view vision of a driver. The floor 104 of the van 82 is kept clear for storage of other objects or for additional seating.

Figure 7:
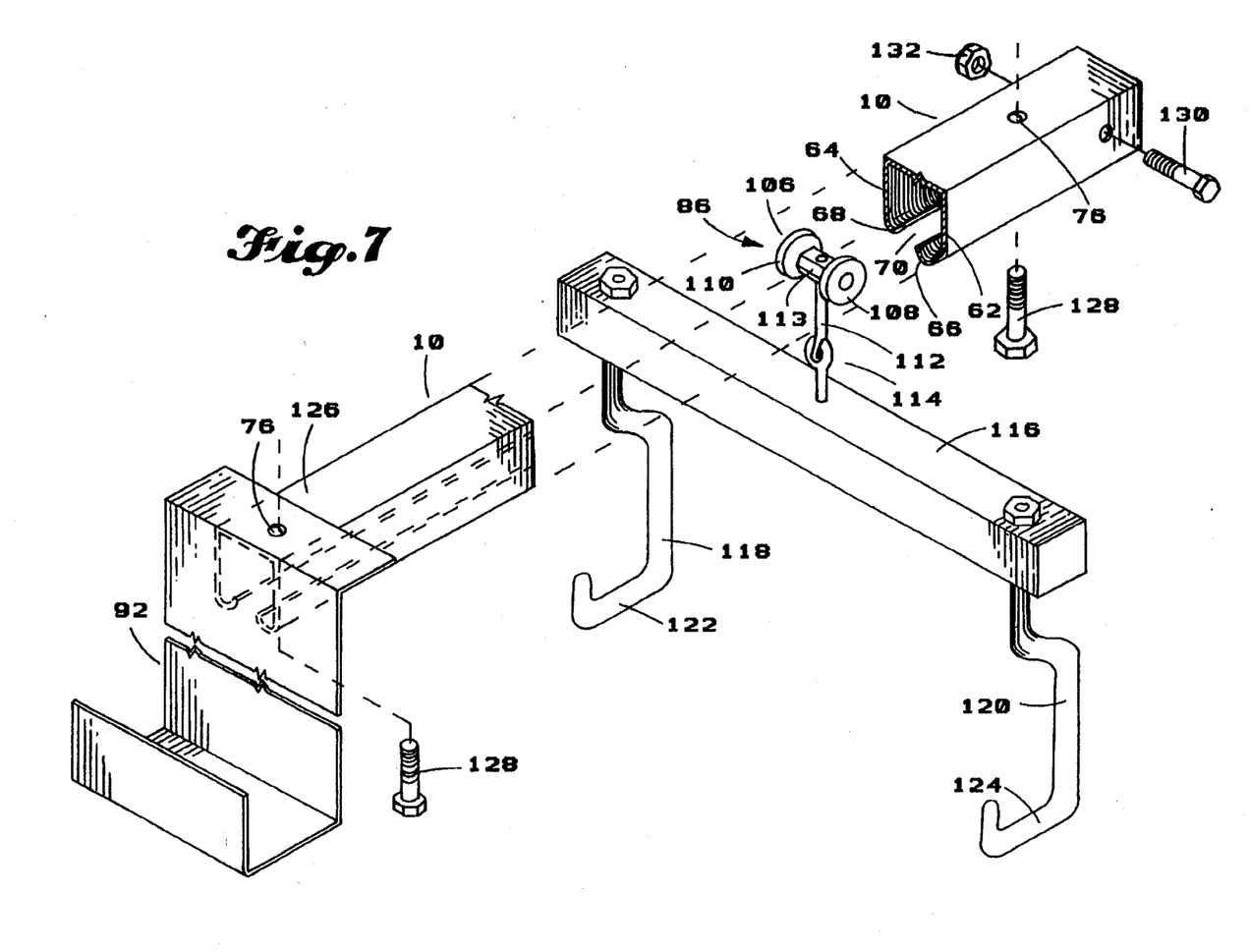
FIG. 7 is a fragmentary pictorial view, partially exploded to show the stepladder storage apparatus shown in FIGS. 4 and 5.

Referring also to FIG. 7, the apparatus for stowing a stepladder 94 includes an elongated track 10 with a carriage 20 having one or more roller assembly(ies) 106 to slide along the length of the track 10. The roller assembly 106 may include a pair of co-axial wheels 108, 110 with a pivoting support stem 112 depending downwardly from an axle 113. A downwardly-opening space 70 between opposite flange portions 66, 68 of the track 10 is constructed to allow the stem portion 112 to pass freely along the length of the track 10. In preferred form, a transverse crossbar 116 is pivotally mounted to the stem portion 112. At opposite ends of the crossbar 116 are hook members 118, 120, each having a throat portion 122, 124 sized to hold one end 96 of a stepladder 94. Adjacent the rear end 126 of the track 10 is a fixed support 92. The fixed support 92 may be of any suitable shape for holding one end 98 or rung 100 of the stepladder 94 or other suspended object. The track 10 is mounted to the overhead support ribs 84 by any commonly known method, such as by screws or bolts 128. It may be desirable to have a stop member, such as a bolt 130 and nut 132 at one or both ends of the track 10 to prevent the carriage 86 from becoming disengaged from the track 10.

Figure 3:
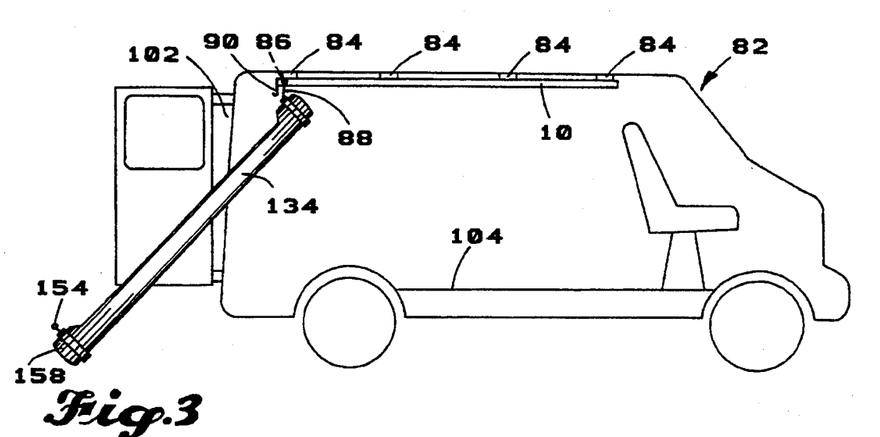
FIG. 3 is a side sectional view, taken substantially along line 3—3 of FIG. 5, of a van with a preferred embodiment of the invention for supporting elongated objects in a tray shown in an open position.
Figure 5:
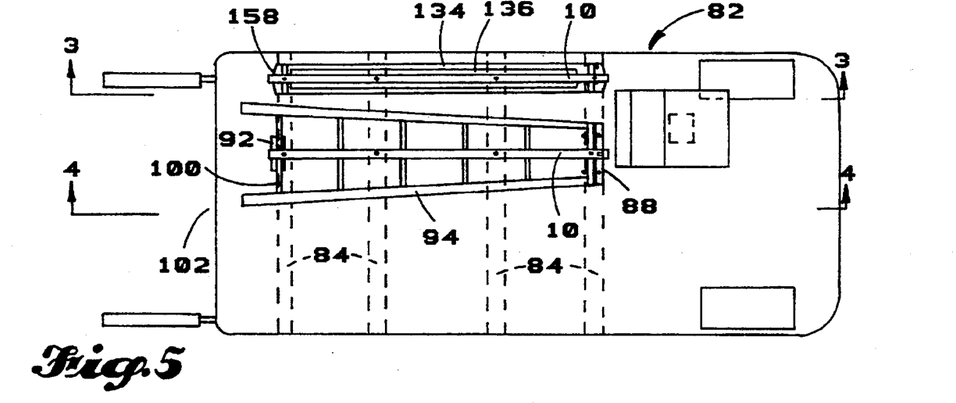
FIG. 5 is an overhead view of the van showing the embodiments of FIGS. 3 and 4, each in a stowed position.
Figure 6:
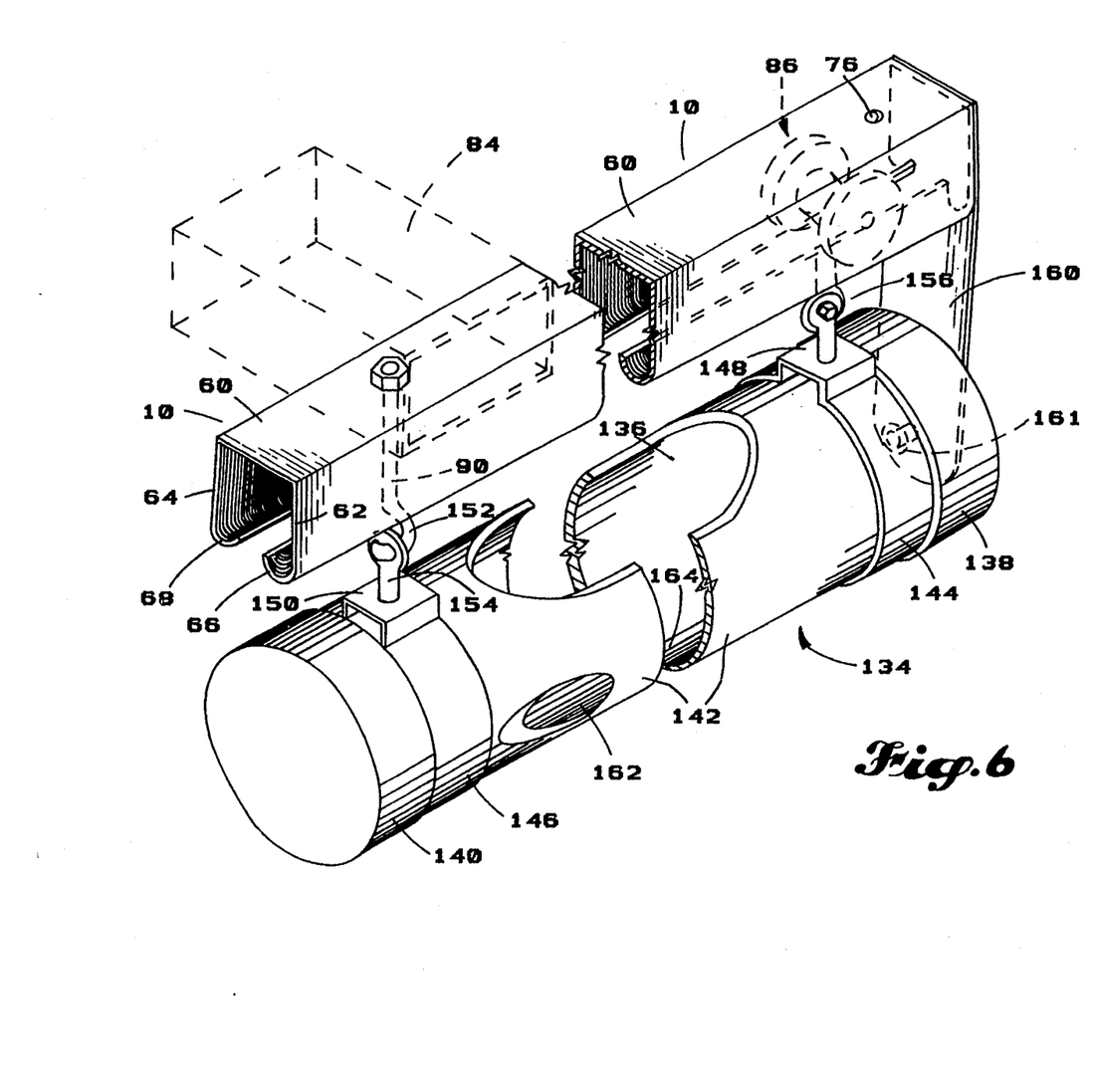
FIG. 6 is a fragmentary pictorial view of the storage tray shown in FIGS. 3 and 5.

Referring now to FIGS. 3, 5, and 6, therein is shown an overhead support apparatus according to yet another preferred embodiment of the invention. In this embodiment, the apparatus includes a support tray 134 for holding a plurality of small, elongated objects, such as drill bits, tubes, or rods and the like. The support tray 134 may be of any suitable configuration which provides a bottom and sidewalls. Typically, the top of the support tray 134 is left open, however, if deemed necessary, a lid could be added. In preferred form, the tray 134 is substantially round in cross-section and may be in the form of a tube or pipe having an upper portion of its sidewall cut away to provide an upper opening 136. It has been found that a length of typical 4-inch PVC plastic pipe is suitable for this purpose. Commonly available end caps 138,140 may be attached to the tube 142 to provide end walls. An opening 136 is cut along the length of the tube 142 to provide sufficient access to the contents. The opening 136 should be sufficiently wide to provide easy access to the stored items, but not so wide as to weaken the integrity of the tube 142. Preferably, the opening 136 is less than one half of the circumference of the tube 142. If deemed necessary, reinforcement members (not shown) may be attached to the tube 142 to provide additional strength and to prevent sagging of a center portion of the tube 142. The tube 142 may be supported adjacent opposite ends by typical and commonly available conduit clamps 144, 146 clamped around the tube 142. An upper portion 148, 150 of each clamp 144, 146 is used to attach the support tray 134 to the fixed and movable support members 90, 86. In preferred form, the fixed support is in the form of a typical hook 152 and eye 154. It is preferred that the slidable support include a pivot 156 to allow the support tray 134 to be dropped downwardly and swung to one side, as shown in FIG. 3. The slidable support includes a carriage 86 in the above-described form. When the support tray 134 is in the open position, its entire contents may easily be viewed and items may easily be inserted or removed from the tray 134. The tray 134 is then lifted and moved toward the front of the van 82 along the track 10 until its rear end 158 is positioned to be hung from the fixed support 90. As previously described, in its stowed position, the support apparatus allows unencumbered access to and the use of the area or floor space 104 below the track 10.

For vehicle-mounted applications, it may be desired to include an anti-sway member 160 to prevent swinging of the tray 134 when the vehicle 82 is in motion. The anti-sway member may be of any suitable configuration, such as downwardly extending from the track 10 or laterally extending from a sidewall of the vehicle 82. It is normally sufficient to provide a brace arm with a commonly known pin-in-socket type connection 161 at one end of the tray 134.

According to another aspect of the invention, a sidewall of the tube 142 is provided with a forwardly-angled opening 162. This allows small, elongated objects to be inserted into the tray 134 without moving the tray 134 from its stowed position. Any elongated object, such as a long drill bit, which has sufficient flexibility to be inserted through a side opening 162 and slid toward the forward end of the tube 142 may be inserted through such an angular opening 162. This is facilitated by the forwardly-directed angle of the opening 162. Once inside the tube 142, the object will drop into a bed area 164 of the tube 142 where it will be securely stowed. Should the item slide rearwardly during transit, it will not be inclined to exit through the angled opening 162, but rather to slide against the rear cap 140.

Figure 8:
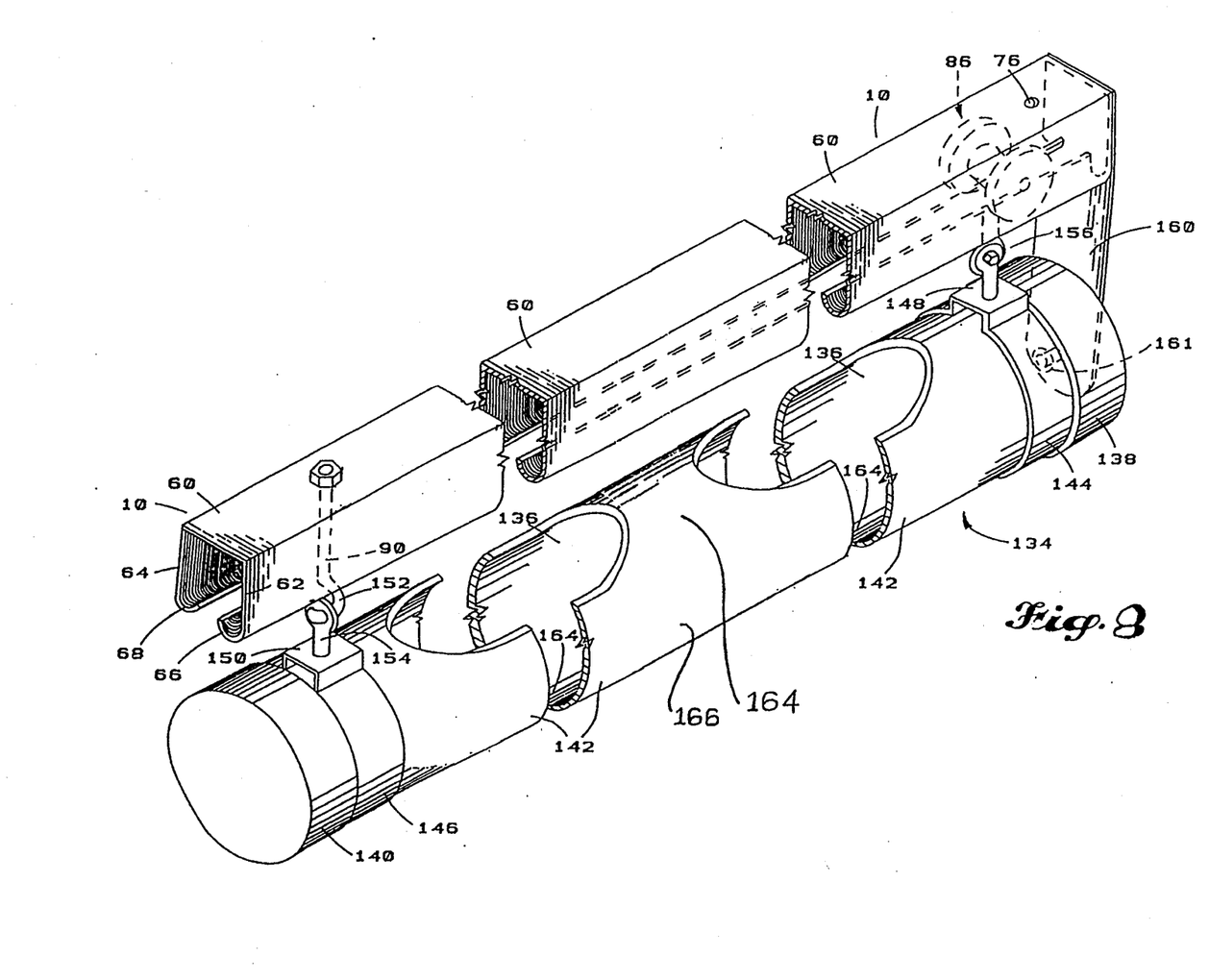
FIG. 8 is a fragmentary pictorial view of an alternate embodiment of the storage tray shown in FIG. 6.

Referring now to FIG. 8, therein is shown an alternate preferred form of the previously-described support tray 134. In this embodiment, the support tray includes a centrally-located interconnecting web 164 which spans across the upper opening 136. It has been found that this interconnecting web 164 adds longitudinal rigidity to the tube 142 by preventing opposite sidewalls from flaring outwardly to a slight extent, thereby allowing a slight but undesirable sag along an intermediate portion 166 of the tube 142. This interconnecting web 164 can be dimensioned to be relatively narrow while remaining fully effective. Such dimensioning and positioning of the interconnecting web 164 does not significantly interfere with the insertion or removal of elongated objects through the opening 136 of the tray 134, and does not significantly interfere with the viewing of elongated objects placed therein. Additionally, it has been found that the previously-described sidewall opening 162 may be eliminated in this embodiment. Small elongated objects may be guided into the tray 134 without moving the tray 134 from its stowed position by inserting one end of the object into the upper opening 136 adjacent the interconnecting web 164 and then pushing the elongated object longitudinally into the tray 134. In this manner, the interconnecting web 164 acts as a guide to prevent the leading end of such an elongated object from being displaced from the tray 134 as it is being longitudinally directed into the tray 134.

Of course, the apparatus of the present invention may be reconfigured as necessary to adapt it for supporting various elongated objects in various locations. The apparatus is particularly suited for parallel storage of several objects in a building or a vehicle, such as shown in FIG. 5. If deemed necessary, more than one track 10 may be used to support a single, particularly heavy object. If necessary, the outer end of the object to be supported may be hoisted by a cable and pulley which would simultaneously lift the object while moving the slidable support 18 along the track 10. An elongated basket or tray may be used with the apparatus for storing boxes or odd-shaped objects overhead.

Because many changes may be made in the configuration of the present apparatus without departing from the spirit and scope of the invention, it is to be understood that my patent protection is not to be limited by the above-described and illustrated embodiments, but rather only by the appended claim or claims interpreted according to accepted doctrines of patent claim interpretation, including the doctrine of equivalents.

What is claimed is:

1. An apparatus for substantially horizontal storage of an elongated object, comprising:
   a storage compartment having an elongated storage zone located in a top portion of said compartment and a second storage zone below and contiguous with said elongated storage zone comprising the remainder of the compartment;
   an elongated track having first and second ends, said track being fixed in position to an overhead support surface and extending longitudinally of said elongated storage zone;

a slidable support member slidably mounted on said track and supporting one end of the elongated object;

a fixed support member adjacent said track's first end; and a support arm extending downwardly from said slidable support member and pivotally attached thereto to allow said elongated object to swing laterally about said pivotal attachment when released from said fixed support member, said fixed support member providing overhead support of another end of the elongated object such that said object is supported in a stowed position adjacent to and along said track longitudinally within said elongated storage zone of said compartment and without supporting structure thereunder precluding separate use of said second storage zone below said elongated storage zone, said slidable support member being slidable to said track's first end adjacent said fixed support member for receiving said object's one end and being slidable away from said fixed support member to allow longitudinal movement of said elongated object into said elongated storage zone for placement of said object's other end on said fixed support member without access to said second storage zone of said compartment below said elongated storage zone.

2. The apparatus of claim 1, wherein said slidable support member includes a carriage with a downwardly-extending support arm, said carriage including a wheel positioned to be supported by and travel on said track.

3. The apparatus of claim 1, wherein said support arm includes a hook having an upwardly-directed throat.

4. The apparatus of claim 1, wherein said track is in the form of an elongated channel having a top panel, a pair of opposite sides downwardly extending from said top panel, and first and second flange portions each extending inwardly from a separate one of said opposite sides and defining a space therebetween.

5. The apparatus of claim 4, wherein said slidable support member includes a carriage with a downwardly-extending support arm, said carriage including a wheel positioned to be supported by and travel on a flange portion.

6. The apparatus of claim 1, further comprising an elongated support tray having a first end detachably attached to said fixed support member and a second end pivotally attached for both lateral and vertical pivotal movement to said slidable support member, wherein said support tray is supported in a stowed position adjacent opposite ends thereof within said elongated storage zone, a first end of said tray being supported by said fixed support member and a second end of said tray being supported by said slidable support member, and is moved to an open position by releasing said first end from said fixed support member and then moving said first end longitudinally and downwardly, thereby moving said second end and said slidable support member along said track toward said track's first end such that the second storage zone below said elongated storage zone is not affected by storage or movement of said support tray on said apparatus.

7. The apparatus of claim 6, wherein said support tray includes opposite end panels and a sidewall panel with an opening formed therein through which an elongated object may be inserted while said tray is in the stowed position, said object being longitudinally captured between said end panels when stowed.

8. The apparatus of claim 6, wherein said elongated support tray includes opposite sidewalls, a substantially open top, and an interconnecting web joining said sidewalls intermediate of said first and second ends.

* * * * *